(12) United States Patent
Lee et al.

(10) Patent No.: US 7,903,688 B2
(45) Date of Patent: Mar. 8, 2011

(54) VOIP ENCODED PACKET PRIORITIZATION DONE PER PACKET IN AN IP COMMUNICATIONS NETWORK

(75) Inventors: Minkyu Lee, Ringoes, NJ (US); James William McGowan, Whitehouse Station, NJ (US); Michael Charles Recchione, Nutley, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 737 days.

(21) Appl. No.: 11/078,012

(22) Filed: Mar. 11, 2005

(65) Prior Publication Data
US 2006/0203822 A1 Sep. 14, 2006

(51) Int. Cl.
*H04J 3/24* (2006.01)
*H04J 3/16* (2006.01)

(52) U.S. Cl. ......... 370/474; 370/468; 370/470; 370/471; 370/472; 370/473

(58) Field of Classification Search .................. 370/394, 370/395, 470–474, 468, 252, 517, 467, 229, 370/230; 375/244
See application file for complete search history.

(56) References Cited

U.S. PATENT DOCUMENTS

| | | | |
|---|---|---|---|
| 6,282,196 B1 * | 8/2001 | Lyons et al. | 370/394 |
| 6,556,567 B1 * | 4/2003 | Murakami et al. | 370/394 |
| 7,006,435 B1 * | 2/2006 | Davies et al. | 370/230 |
| 7,359,979 B2 * | 4/2008 | Gentle et al. | 709/231 |
| 2004/0022190 A1 * | 2/2004 | Davies et al. | 370/230 |
| 2004/0022246 A1 * | 2/2004 | Davies et al. | 370/394 |
| 2004/0196855 A1 * | 10/2004 | Davies et al. | 370/395.42 |

OTHER PUBLICATIONS

RFC 3558, "RTP Payload Format for Enchanced Variable Rate Codecs (EVRC) and Selectable Mode Vocoders (SMV)", Jul. 2003, Internet Engineering Task Force (IETF—Network Working Group), all pages.*
Hiller et al., "RTP Payload format for EVRC", Dec. 2000, Internet Engineering Task Force (IETF—Audio-Video Transport Working Group), all pages.*
Pillai, K. et al., "Protocol Sensitive Dynamic Packet Classification Using DifferentiatedServices Code Points", Oct. 8-9, 2004, Proceedings of the IEEE Emerging Technology Symposium 2004, all pages.*
Sanneck, H. et al., "Selective Packet Prioritization for Wireless VoIP", Sep. 2001, Fourth International Symposium on Wireless Personal Multimedia Communication (Aalborg, Denmark), all pages.*

(Continued)

*Primary Examiner* — Aung S Moe
*Assistant Examiner* — Adam Duda
(74) *Attorney, Agent, or Firm* — Kenneth M. Brown (57) ABSTRACT

A method and apparatus for routing voice packets through a communications network wherein the routing priority of the packets is based on a location of a packet within a sequence of transmitted voice packets, relative to one or more identified voice packets in the transmitted sequence. In one embodiment of the invention, the routing priority of a voice packet is based on the location of the packet in a sequence of packets relative to voice activity, such as the beginning, middle or end of a talk spurt. For example, the routing priority of the first several voice packets of a talk spurt is increased to compensate for the fact that there is less network jitter protection available at the receiver for these packets. In another embodiment, the routing priority of a voice packet may depend upon its location relative to a cellular handoff from one transmitter to another.

16 Claims, 3 Drawing Sheets

OTHER PUBLICATIONS

RFC 2475, "An Architecture for Differentiated Services", Dec. 1998, Internet Engineering Task Force (IETF—Network Working Group), all pages.*

U.S. Appl. No. 11/062,966, filed Feb. 22, 2005, Lee.

Kansar, A., et al., "Jitter-free audio playout over best effort packet networks," in *ATM Forum International Symposium*, New Delhi, India, 2001.

Yi, J.L., et al., Adaptive playout scheduling and loss concealment for voice communications over IP networks, *IEEE Transactions on Multimedia*, Apr. 2001.

Moon, S.B., et al., Packet audio playout delay adjustment: Performance bounds and algorithms, *ACM/Springer Multimedia Systems*, 6:17-28, Jan. 1998.

Pinto, J., et al., "An algorithm for playout of packet voice based on adaptive adjustment of talkspurt silence periods," in *Proceedings of the IEEE Conference on Local Computer Networks*, pp. 224-231, Oct. 1999.

Ramachandran, R., et al., "Adaptive playout mechanisms for packetized audtio applications in wide-area networks," in *Proceedings of the IEEE Infocom*, pp. 680-688, 1994.

\* cited by examiner

VOIP ENCODED PACKET PRIORITIZATION DONE PER PACKET IN AN IP COMMUNICATIONS NETWORK

FIELD OF THE INVENTION

The present invention relates generally to the field of packet based communications networks for providing VoIP (Voice over Internet Protocol) communications services, and in particular to a method and apparatus for performing routing of voice packets through a VoIP network based on a relative location of the packet within a sequence of transmitted voice packets.

BACKGROUND OF THE INVENTION

When voice packets are transmitted through a communications network for providing VoIP (Voice over Internet Protocol), the regularity of intervals between the receipt of consecutive packets is inevitably disrupted. This phenomenon is known as "network jitter." Such jitter can cause packet losses whenever a packet arrives too late and thereby misses its playback time, and these packet losses eventually degrade voice quality. In typical state-of-the-art VoIP systems, a packet buffer on the receiving end is used to alleviate this problem by adding a fixed amount of initial playback delay to compensate for the jitter. This "jitter buffer" then supplies a steady stream of voice packets into a playout mechanism, starting after the fixed delay. Thus, any amount of jitter up to the amount of the fixed delay will be accommodated with no loss of voice quality. Only packets whose delay in transmission exceeds this fixed delay will be "lost." (For such "lost" packets, most systems employ conventional packet loss concealment techniques in an attempt to limit the resulting degradation of voice quality. Nonetheless, excessive packet loss will invariably result in significant voice quality degradation.)

In co-pending U.S. patent application Ser. No. 11/062,966, "Method And Apparatus For Handling Network Jitter In A Voice-Over IP Communications Network Using A Virtual Jitter Buffer And Time Scale Modification," filed by M. Lee et al. on Feb. 22, 2005, and commonly assigned to the assignee of the present invention, a novel technique for use in a VoIP network which advantageously handles network jitter at the receiver without introducing additional playback latency was disclosed. In particular, the novel method disclosed therein makes use of a virtual jitter buffer and time scale modification (i.e., expansion or contraction of the voice data contained in a voice packet).

More specifically, in one embodiment disclosed therein, a method identifies a sequence of received voice packets as comprising a talk spurt, and then, starting with a virtual jitter buffer having an initial playback latency of zero, the method advantageously performs time-expansion prior to playing out the first several voice packets of the talk spurt, thereby increasing the effective latency of the jitter buffer (and therefore the amount of jitter delay handled) until a predetermined maximum effective latency is reached. (A "talk spurt" is a segment of a talker's speech preceded and followed by silence.) Then, subsequent packets are played out at their normal length (i.e., at normal speed), until the receipt of a packet indicative of the end of a talk spurt is detected, at which point the remaining (un-played out) voice packets are time-compressed as they are played out to return the effective jitter buffer latency to zero. Co-pending U.S. patent application Ser. No. 11/062,966, "Method And Apparatus For Handling Network Jitter In A Voice-Over IP Communications Network Using A Virtual Jitter Buffer And Time Scale Modification," is hereby incorporated by reference as if fully set forth herein.

Although the above-described talk spurt management technique disclosed in co-pending U.S. patent application Ser. No. 11/062,966, "Method And Apparatus For Handling Network Jitter In A Voice-Over IP Communications Network Using A Virtual Jitter Buffer And Time Scale Modification," identified above, advantageously provides network jitter protection for most of the packets of a given talk spurt, it is clear that at least the first several packets of a talk spurt (i.e., those that are advantageously time-expanded in order to increase the playback latency of the virtual jitter buffer) are not as protected from network jitter as the rest of the packets in the talk spurt. Thus, even with use of this talk spurt management technique, there remains some increased risk of packet loss at the beginning of each talk spurt.

SUMMARY OF THE INVENTION

In accordance with the principles of the present invention, a method and apparatus is provided for routing voice packets through a communications network wherein the routing priority of the packets is advantageously based on a location of a packet within a sequence of transmitted voice packets, relative to certain events. Note that routers in data networks typically use various scheduling algorithms in order to deliver incoming packets to their destinations. For example, it is common that such routers handle voice packets with higher priority than data packets, since it is typically more critical to minimize the total transmission delay of such voice packets. But prior art routers do not normally give differing routing priorities to different voice packets. We, however, have recognized that within a transmitted sequence of voice packets, some are "more important" than others. (That is, it is more important to minimize the total transmission delay of some relative to others.)

Specifically, a method and apparatus for routing one or more voice packets in a communications network is provided, wherein the one or more voice packets are comprised in a transmitted sequence of voice packets, and wherein the method or apparatus comprises steps of or means for receiving a given voice packet to be routed; determining that the given voice packet to be routed has a particular location in the sequence of transmitted voice packets relative to one or more identified voice packets in the transmitted sequence of voice packets; and setting a routing priority associated with the given voice packet to be routed based upon the particular location in the transmitted sequence of the voice packets relative to the one or more identified voice packets in the transmitted sequence of voice packets.

In accordance with one illustrative embodiment of the present invention, for example, the routing priority of a voice packet is based on the location of the packet in a sequence of packets relative to voice activity, such as the beginning, middle or end of a talk spurt. For example, when the talk spurt management technique described above is employed at the receiver, the routing priority of the first several voice packets of a talk spurt may be advantageously increased (relative to the priority of other voice packets), in order to compensate for the fact that there is less network jitter protection available at the receiver for these packets. Similarly, also when the talk spurt management technique described above is employed at the receiver, the routing priority of the packet indicating the end of a talk spurt may be advantageously increased, in order to allow reliable detection of the end of the talk spurt at the receiver.

In accordance with another illustrative embodiment of the present invention, the routing priority of a voice packet may depend upon its location relative to a handoff decision (i.e., a decision by a voice terminal to change the current transmitter servicing the call from a first transmitter to a second transmitter). For example, as a voice terminal undergoes a handoff from a first transmitter to a second transmitter, the packets which will initially be received by the voice terminal from the second transmitter are, in accordance with the illustrative embodiment of the present invention, advantageously given a higher routing priority (relative to the other packets) in order to ensure a timely arrival. Prioritizing the first few packets from the second transmitter advantageously provides a smoother transition from the first transmitter to the second transmitter by avoiding the "service gap" which otherwise occurs when these packets arrive late.

DETAILED DESCRIPTION OF THE ILLUSTRATIVE EMBODIMENTS

In accordance with one illustrative embodiment of the present invention, a location-based packet prioritization scheme is advantageously employed for use with the active talk spurt management technique described above. The talk spurt management technique employs time-scale modification techniques to create a virtual jitter buffer within a talk spurt. This virtual jitter buffer advantageously provides substantial jitter protection for most of the voice packets, but the first several packets of a talk spurt, received while the virtual jitter buffer is being built up, are still nonetheless vulnerable to network jitter. In addition, note that the accurate detection of the end of a talk spurt is advantageously enhanced with the timely arrival of the last speech packet of the talk spurt. The illustrative location-based packet prioritization scheme described herein advantageously protects these relatively critical packets to make the talk spurt management algorithm more robust.

Figure 1:
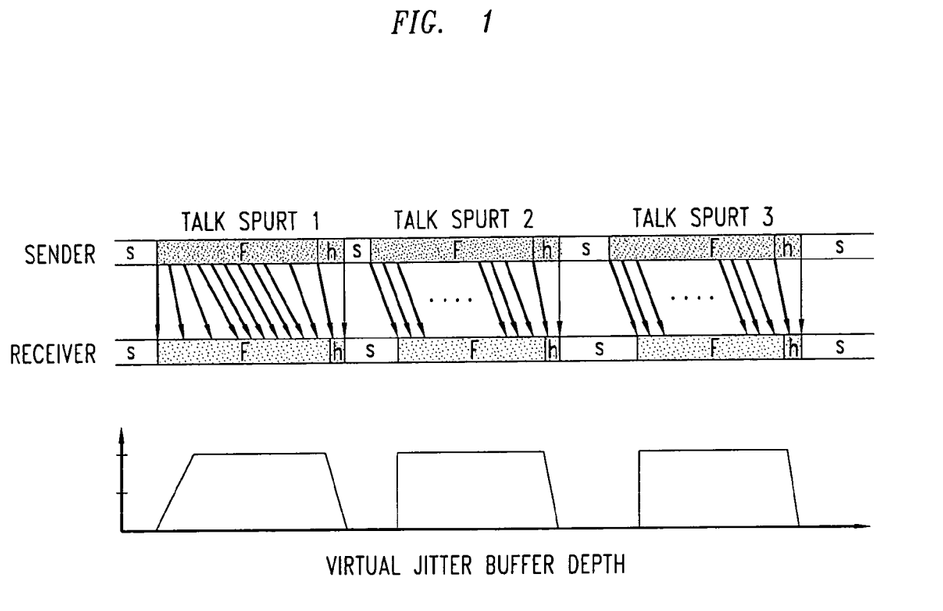
FIG. 1 shows the operation of a time scale modification technique for performing active talk spurt management of a conversational turn with use of a virtual jitter buffer in accordance with a talk spurt management technique to which an illustrative embodiment of the present invention may be advantageously applied.

FIG. 1 shows the operation of a time scale modification technique for performing active talk spurt management of a conversational turn with use of a virtual jitter buffer in accordance with a talk spurt management technique to which an illustrative embodiment of the present invention may be advantageously applied. Note that the sender and the receiver timing sequences are drawn ignoring the network transmission delay. In accordance with the principles of the talk spurt management technique, the time scale of the beginning portion of each talk spurt is either expanded or delayed depending on the location of the packet within a talk spurt, and depending on whether the talk spurt is the first in a conversational turn. This advantageously creates a virtual jitter buffer, particularly within the center portion of the talk spurts. However, at the end of a talk spurt, playback time is advantageously contracted in order to synchronize the talk spurt with the sender, thereby effectively eliminating the virtual jitter buffer protection. (Note that this is necessary at the end of each talk spurt because the receiver does not know whether the end of a talk spurt is actually the end of conversational turn.) Contracting the ending portion of each talk spurt advantageously ensures that the lengths of the conversational turn are the same at both the sender and the receiver sides.

Reliable detection of each talk spurt is important for effective talk spurt management. The beginning portion of each conversational turn is vulnerable to network jitter since the virtual jitter buffer has not fully grown to the target depth. As can be seen in FIG. 1, the virtual jitter buffer depth is advantageously at the predetermined maximum jitter buffer depth for all active speech packets except for those at the beginning part of the first talk spurt in a conversational turn. Thus, the first several voice packets of each talk spurt will be more vulnerable to network jitter. For example, if the first packet of the first talk spurt of a conversational turn is delayed, the delay will be directly reflected to the play out time, which results in increased conversational delay. In addition, the first several packets have a greater risk of being lost since they have less jitter protection. Therefore, in accordance with an illustrative embodiment of the present invention, a packet prioritization scheme for the routing of voice packets advantageously protects these first several packets from network jitter.

The jitter of the last packet in a talk spurt also can negatively impact the perceived delay. The talk spurt management algorithm starts performing time scale contraction when it detects the end of the current talk spurt. If a packet that indicates that the talk spurt ending is jittered late (i.e., is delayed), the current talk spurt end will also get delayed, resulting in increased conversational delay. Therefore, in accordance with an illustrative embodiment of the present invention, a packet prioritization scheme for the routing of voice packets advantageously protects this last packet in a talk spurt from network jitter.

In accordance with an illustrative embodiment of the present invention, a packet prioritization scheme for the routing of voice packets advantageously employs a method for detecting talk spurts using rate information such as is provided by most variable rate vocoders (voice coders). For example, the well known EVRC vocoder, a standard voice codec (coder/decoder) used in conventional CDMA wireless communication systems fully familiar to those skilled in the art, uses variable encoding rates—full-rate encodings and half-rate encodings for active speech packets, and ⅛ rate encodings for silence interval packets.

In accordance with an illustrative embodiment of the present invention, the beginning of a new conversational turn may be advantageously detected when the number of consecutive ⅛-rate packets exceeds a certain predetermined threshold, such as, for example, 20 frames. Note that if ⅛-rate packets are suppressed (or blanked), as they are in some vocoder implementations, an internal clock or communication protocol, such as Real-Time Protocol (RTP), fully familiar to those of ordinary skill in the art, can instead be used to effectively count the number of such packets that would have been sent. If a full rate packet follows a series of ⅛-rate packets whose length is larger than a certain threshold, this fact may be advantageously used to indicate the beginning of a new conversational turn. Moreover, the first packet of a talk spurt may be advantageously detected by, for example, looking for a full rate packet following an ⅛-rate packet in the EVRC system. Detecting the end of a talk spurt or conversational turn may be advantageously achieved by the detection of a half-rate packet.

Figure 2:
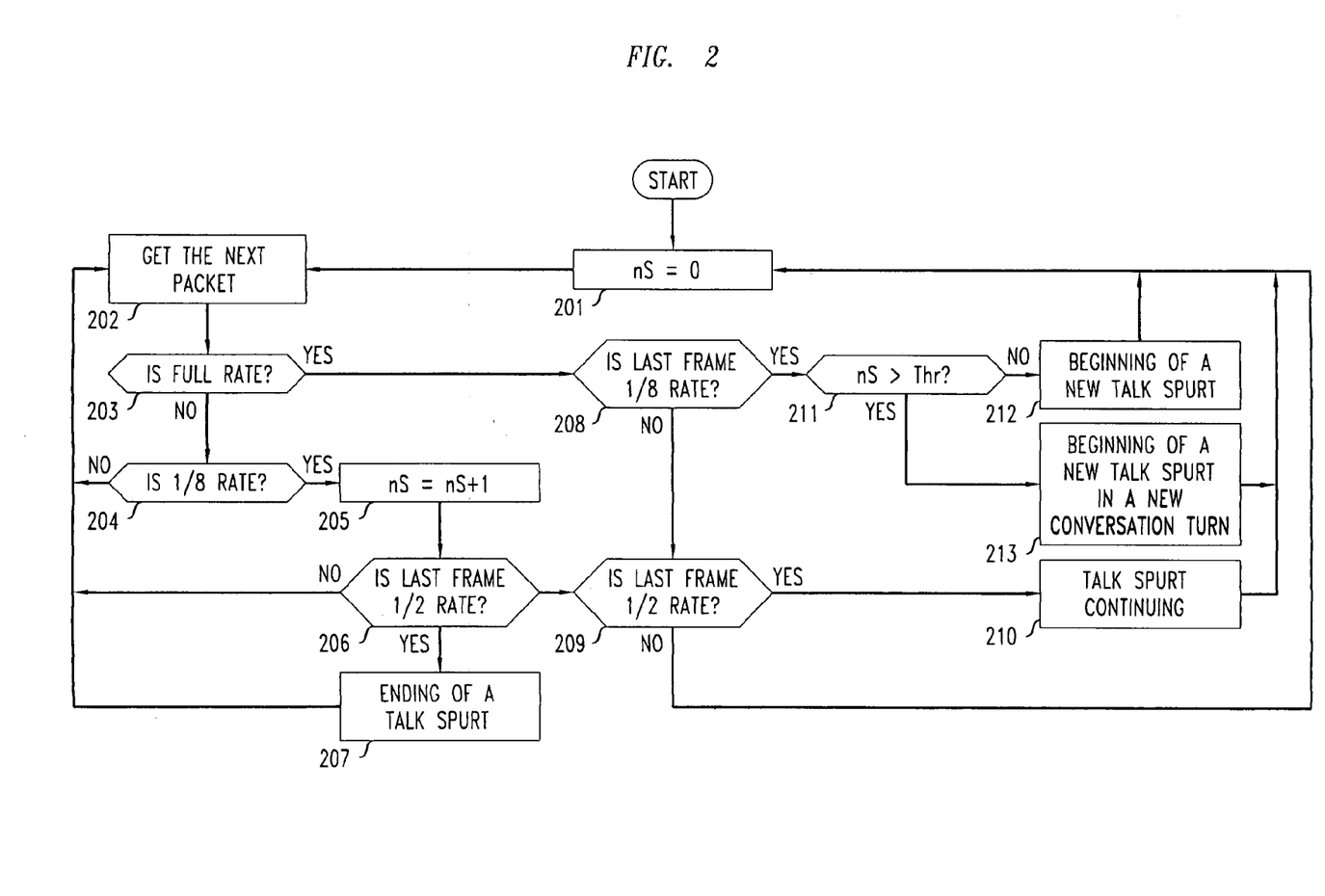
FIG. 2 shows a flow diagram of a method for performing talk spurt detection which may be advantageously employed in accordance with an illustrative embodiment of the present invention.

FIG. 2 shows a flow diagram of a method for performing talk spurt detection which may be advantageously employed in accordance with an illustrative embodiment of the present invention. The method shown in the figure assumes the rate encoding characteristics of EVRC vocoders as described above.

In particular, in accordance with the illustrative embodiment of the present invention shown in FIG. 2, the beginning of a new talk spurt is advantageously assumed if there have been nThr1 (a predetermined threshold value) or more silence packets (e.g., ⅛ rate packets in the EVRC codec). When a speech packet (e.g., full or half-rate packets in the EVRC codec) is received, it is advantageously played without delay, and stretched to build the virtual jitter protection. If fewer than nThr0 (another predetermined threshold where nThr0<nThr1) silence packets have been received, then the silence is advantageously interpreted as inter-talk silence, and the identical stretching strategy is advantageously used. (Illustratively, nThr0 may be equal to 3 and nThr1 may be equal to 15.) This avoids pumping silence into the middle of a word. If the length of the silence interval (in packets) is between the two thresholds nThr0 and nThr1, then silence is advantageously inserted to build the jitter protection to its maximum before the next speech packet is played.

Also in accordance with the illustrative embodiment of the present invention shown in FIG. 2, a talk spurt is advantageously assumed to end when a half-rate packet is received. (Note that in EVRC codecs, a talk spurt necessarily ends in such a half-rate packet, although half-rate frames can occur in other situations as well). Thus, when the half-rate packet is received, the entire virtual jitter buffer contents are compressed into the nominal playback time of a packet (e.g., 20 milliseconds for EVRC codecs). By the time the last voice packet in the current talk spurt is played, the virtual jitter buffer size is advantageously back to zero latency, meaning the time lag between the encoder and decoder is back to where it was when the current talk spurt began. This advantageously ensures that the talk spurt length of sender is equal to that of the receiver.

Specifically, the flowchart of FIG. 2 begins by setting the counter nS to zero in box 201, and by then getting the next packet in box 202 and checking to see if it is a full-rate packet in decision box 203. If it is not a full-rate packet, decision box 204 checks to see if it is a ⅛ rate packet. If it is not a ⅛ rate packet, flow returns to box 202 to get the next packet, but if it is a ⅛ rate packet, box 205 increments the counter nS, and then decision box 206 checks to see if the last frame was a ½ rate packet. If the last frame was a ½ rate packet, box 207 identifies the ending of a talk spurt, and, in either case (whether the last frame was a ½ rate packet or not) flow returns to box 202 to get the next packet.

If decision box 203 determines that the packet is a full-rate packet, decision box 208 checks to see if the last frame was an ⅛ rate packet. If the last frame was not an ⅛ rate packet, decision box 209 checks to see if the last frame was an ½ rate packet, and if it was, box 210 identifies that the talk spurt is continuing. Then, regardless of whether the last frame was an ⅛ rate packet or not, flow returns to box 201 to reset the counter nS to zero.

If, on the other hand, decision box 208 determines that the last frame was a ⅛ rate packet, decision box 211 checks to see if the value of the counter nS lies between the thresholds nThr0 and nThr1. If the value of the counter nS does lie between these thresholds, box 212 identifies the beginning of a new talk spurt. If, on the other hand, the value of the counter nS does not lie between these thresholds, box 213 identifies the beginning of a new talk spurt in a new conversational turn or inter-word silence. In either case (whether or not the value of the counter nS lies between the thresholds), flow returns to box 201 to reset the counter nS to zero.

Note that in accordance with the above-described illustrative embodiment of the present invention, the initial and final packets of a talk spurt are the only particularly relevant packets for the perceived conversational delay. However, in accordance with other illustrative embodiments of the present invention, the prioritization of other packets may be advantageously based on characteristics relating to their location within a sequence of transmitted voice packets. For example, although voice packets containing only silence are frequently suppressed in certain VoIP networks, an occasional "heartbeat" packet will often be sent during the period of silence in such networks to provide the decoder with confirmation that the connection is still alive. In accordance with one illustrative embodiment of the present invention, a high routing priority is advantageously given to one or more of these "heartbeat" packets, thereby allowing the encoder and decoder to advantageously estimate a minimal transmission delay across the network. This may then be advantageously used as a parameter in a quality rating algorithm for the connection, or, alternatively, to estimate the clock slew (clock rate difference between the sender and the receiver).

In addition, in accordance with another illustrative embodiment of the present invention, connection-related information, such as cellular handoff events, create situations in which different packet priorities may be advantageously assigned to different packets based on their location within a transmitted sequence of packets. For example, as a cellular terminal (e.g., a cell phone) hands-off from a first transmitter to a second transmitter, the packets to be received from the second transmitter are, in accordance with one illustrative embodiment of the present invention, given a higher routing priority to ensure a timely arrival (avoiding the so-called "service gap" which occurs when such packets arrive extremely late). Note that, in hand-offs which occur in certain cellular systems an "overlap" is applied, in which both the first transmitter and the second transmitter transmit identical packets to ease the handoff transition. In this case, again in accordance with one illustrative embodiment of the present invention, since the packets which are to be received by the first transmitter are essentially redundant, those to be received from the second transmitter are advantageously given a higher priority, and the packets to be received from the first transmitter are advantageously given a lower priority.

Therefore, in accordance with an illustrative embodiment of the present invention, a scheduler in a packet router advantageously employs rate information to identify critical packets and give them a higher routing priority than the rest of the packets. For example, the first n packets of a sequence of transmitted packets representing a talk spurt (where n is a predetermined number such as, for example, 4) may be advantageously identified and given a higher routing priority than the other packets in the sequence. In one (simple) illustrative embodiment of the present invention, the first n full rate packets following a sequence (having a minimum length) of ⅛-rate packets are so identified and advantageously given a high routing priority as being the first n packets of a talk spurt. In addition, in accordance with the illustrative embodiment of the present invention, the end (i.e., the last packet) of the talk spurt is also advantageously identified and given a higher routing priority, in order to provide for a more reliable detection of talk spurt ending. More specifically, a ½-rate packet is identified as the last packet of the talk spurt, and is therefore advantageously given the higher routing priority. Note that occasionally, a ½-rate packet may be followed by a full rate packet, and would therefore not indicate a new talk spurt. In this case, also in accordance with the illustrative embodiment of the present invention, this full rate packet (and a number of following packets) may be advantageously prioritized with a high routing priority to ensure that the decoder recognizes that the talk spurt is continuing and has not truly ended.

Figure 3:
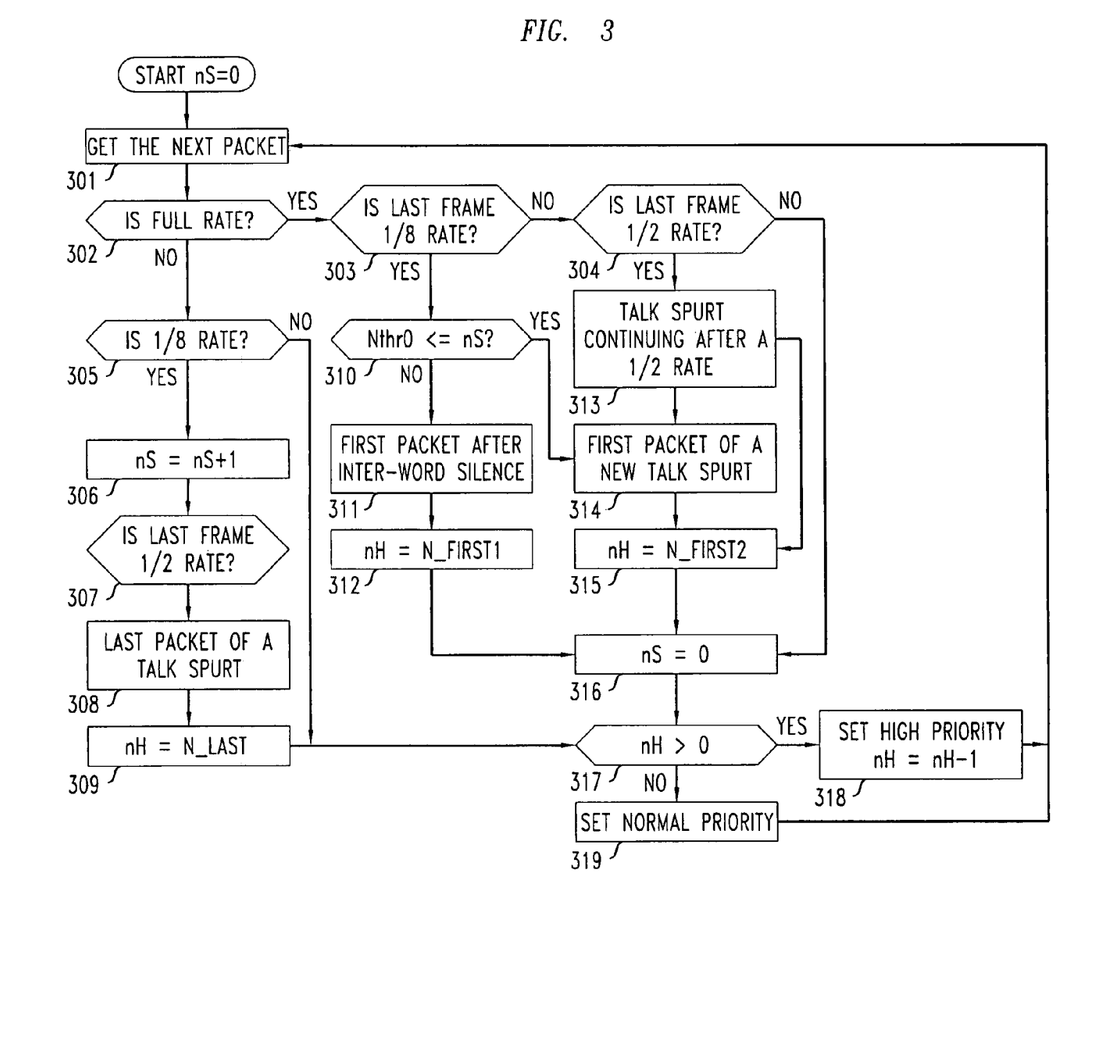
FIG. 3 shows a flow diagram of a method for performing routing of voice packets to a receiver using a talk spurt management technique in accordance with an illustrative embodiment of the present invention.

FIG. 3 shows a flow diagram of a method for performing routing of voice packets to a receiver using a talk spurt management technique in accordance with an illustrative embodiment of the present invention. (Note that it is assumed that in accordance with this illustrative embodiment of the present invention, that ⅛-rate packets are not blanked.) Specifically, the illustrative embodiment of the present invention shown in FIG. 3 begins by getting a next packet in box 301. Then, it is determined whether the given packet is a full rate packet (box 302). If it is, it is next determined whether the last frame was a ⅛-rate packet (box 303), and if not, whether the last frame was a ½-rate packet (box 304).

In the case where the given packet is determined (by box 302) not to be a full rate packet, it is determined whether the given packet is a ⅛-rate packet (box 305). If so, counter nS is incremented (box 306). (Counter nS is advantageously used to count a number of contiguous ⅛-rate packets without an intervening full rate packet.) Then, if the last frame was a ⅛-rate packet (box 307), the last frame is identified as the last packet of a talk spurt (box 308) and parameter nH is set equal to the non-zero value N_LAST to so indicate (box 309). Flow then proceeds to box 317, discussed below. If, on the other hand, it is determined that the given frame is not a ⅛-rate packet (by box 305) or, it is determined that the given frame is a ⅛-rate packet (by box 305) but that the last frame is not a ⅛-rate packet (by box 307), then flow proceeds directly to box 317 discussed below.

If it is determined that the given frame is a full rate packet (by box 302) and that the last frame was a ⅛-rate packet (by box 303), then it is determined whether the current value of the counter nS is greater than or equal to a predefined threshold, nThr0 (box 310). If nS is greater than or equal to the threshold nThr0, then the given frame is identified as a first packet of a new talk spurt (box 314), and the parameter nH is set equal to the non-zero value N_FIRST2 to so indicate (box 315). If nS is less than the threshold nThr0, then the given frame is identified as a first packet after inter-word silence (box 311), and the parameter nH is set equal to the non-zero value N_FIRST1 to so indicate (box 312). In either case the counter nS is set equal to zero (box 316) and flow proceeds to box 317 discussed below.

If, on the other hand, it is determined that the given frame is a full rate packet (by box 302) but that the last frame was not a ⅛-rate packet (by box 303) but rather was a ½-rate packet (by box 304), then it is identified that the talk spurt is continuing after a ½-rate packet (box 313) in which case the parameter nH is also set equal to the value N_FIRST2 to so indicate (box 315), the counter nS is set equal to zero (box 316), and flow proceeds to box 317 discussed below.

After the above analysis of the given packet and preceding frames thereto has been performed, box 317 determines whether the value of the parameter nH is greater than zero which will be the case if either of boxes 309, 312 or 315 set nH to the non-zero values N_LAST, N_FIRST1 or N_FIRST2, respectively). Note that the specific numerical values of N_LAST, N_FIRST1 and N_FIRST2 may be advantageously set depending on the maximum virtual jitter buffer size and on the time scale expansion ratio being used. Illustratively, N_LAST may be advantageously set equal to 1 and both N_FIRST1 and N_FIRST2 may be advantageously set equal to 4 for a 40 millisecond virtual jitter buffer when a 50% time expansion is used with a 20 millisecond voice packet.

If the parameter nH is greater than zero (as determined by box 317), then in accordance with the illustrative embodiment of the present invention, the routing priority of the given packet is advantageously set to a high priority, and the value of the parameter nH is decremented by one (box 318). If, on the other hand, the value of the parameter nH is equal to zero (as determined by box 317), then the routing priority of the given packet is set to a normal priority (box 319). In either case, flow returns to box 301 to get (and analyze) the next packet.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. In addition, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

We claim:

1. A method for routing one or more voice packets in a communications network, the one or more voice packets comprised in a transmitted sequence of voice packets, the method comprising:

receiving a given voice packet to be routed;

determining that said given voice packet to be routed has a particular location in said sequence of transmitted voice packets relative to one or more other identified voice packets in said transmitted sequence of voice packets; and setting a routing priority associated with said given voice placket to be routed based upon said particular location in said transmitted sequence of said voice packets relative to said one or more other identified voice packets in said transmitted sequence of voice packets, wherein said sequence of voice packets comprises voice data representative of a talk spurt, wherein said one or more identified voice packets in said transmitted sequence of voice packets comprises a first voice packet in said talk spurt, and wherein said particular location of said voice packet to be routed comprises said voice packet to be routed being within a predetermined number of packets of said first packet in said talk spurt.

2. The method of claim 1 wherein said first voice packet in said talk spurt is identified based on said first voice packet comprising a frame which is not a one-eighth rate frame having immediately followed a frame which is a one-eighth rate frame.

3. The method of claim 1 wherein said routing priority associated with said given voice packet to be routed is set higher than one or more routing priorities associated with a majority of said voice packets comprised in said transmitted sequence of voice packets.

4. A voice packet router in a communications network, the router having received a given voice packet to be routed, the given voice packet comprised in a transmitted sequence of voice packets, the router comprising:
 a scheduler which determines that said given voice packet to be routed has a particular location in said sequence of transmitted voice packets relative to one or more other identified voice packets in said transmitted sequence of voice packets and which sets a routing priority associated with said given voice packet to be routed based upon said particular location in said transmitted sequence of said voice packets relative to said one or more other identified voice packets in said transmitted sequence of voice packets, wherein said sequence of voice packets comprises voice data representative of a talk spurt, wherein said one or more identified voice packets in said transmitted sequence of voice packets comprises a first voice packet in said talk spurt, and wherein said particular location of said voice packet to be routed comprises said voice packet to be routed being within a predetermined number of packets of said first packet in said talk spurt.

5. The router of claim 4 wherein said first voice packet in said talk spurt is identified based on said first voice packet comprising a frame which is not a one-eighth rate frame having immediately followed a frame which is a one-eighth rate frame.

6. The router of claim 4 wherein said routing priority associated with said given voice packet to be routed is set higher than one or more routing priorities associated with a majority of said voice packets comprised in said transmitted sequence, of voice packets.

7. A method for routing one or more voice packets in a communications network, the one or more voice packets comprised in a transmitted sequence of voice packets, the method comprising:
 receiving a given voice packet to be routed;
 determining that said given voice packet to be routed has a particular location in said sequence of transmitted voice packets relative to one or more other identified voice packets in said transmitted sequence of voice packets; and
 setting a routing priority associated with said given voice packet to be routed based upon said particular location in said transmitted sequence of said voice packets relative to said one or more other identified voice packets in said transmitted sequence of voice packets,
 wherein said sequence of voice packets comprises voice data representative of a talk spurt,
 wherein said one or more identified voice packets in said transmitted sequence of voice packets comprises a last voice packet in said talk spurt, and wherein said particular location of said voice packet to be routed comprises said voice packet to be routed being said last voice packet in said talk spurt.

8. The method of claim 7 wherein said last voice packet in said talk spurt is identified based on said last voice packet comprising a half rate frame.

9. The method of claim 7 wherein said routing priority associated with said given voice packet to be routed is set higher than one or more routing priorities associated with a majority of said voice packets comprised in said transmitted sequence of voice packets.

10. A voice packet router in a communications network, the router having received a given voice packet to be routed, the given voice packet comprised in a transmitted sequence of voice packets, the router comprising:
 a scheduler which determines that said given voice packet to be routed has a particular location in said sequence of transmitted voice packets relative to one or more other identified voice packets in said transmitted sequence of voice packets and which sets a routing priority associated with said given voice packet to be routed based upon said particular location in said transmitted sequence of said voice packets relative to said one or more other identified voice packets in said transmitted sequence of voice packets, wherein said sequence of voice packets comprises voice data representative of a talk spurt, wherein said one or more identified voice packets in said transmitted sequence of voice packets comprises a last voice packet in said talk spurt, and wherein said particular location of said voice packet to be routed comprises said voice packet to be routed being said last voice packet in said talk spurt.

11. The router of claim 10 wherein said last voice packet in said talk spurt is identified based on said last voice packet comprising a half rate frame.

12. The router of claim 10 wherein said routing priority associated with said given voice packet to be routed is set higher than one or more routing priorities associated with a majority of said voice packets comprised in said transmitted sequence of voice packets.

13. A method for routing one or more voice packets in a communications network, the one or more voice packets comprised in a transmitted sequence of voice packets, the method comprising:
 receiving a given voice packet to be routed;
 determining that said given voice packet to be routed has a particular location in said sequence of transmitted voice packets relative to one or more other identified voice packets in said transmitted sequence of voice packets; and
 setting a routing priority associated with said given voice packet to be routed based upon said particular location in said transmitted sequence of said voice packets relative to said one or more other identified voice packets in said transmitted sequence of voice packets,
 wherein
 (i) said communications network comprises a wireless communications network comprising a cellular terminal, a first transmitter and a second transmitter,
 (ii) said sequence of voice packets comprises a sequence of voice packets to be transmitted to said cellular terminal via said second transmitter as a result of a cellular hand-off from said first transmitter to said second transmitter,
 (iii) said one or more identified voice packets in said transmitted sequence of voice packets comprises a first voice packet in said sequence of voice packets to be transmitted to said cellular terminal via said second transmitter, and
 (iv) said particular location of said voice packet to be routed comprises said voice packet to be routed being within a predetermined number of packets of said first packet in said sequence of voice packets to be transmitted to said cellular terminal via said second transmitter.

14. The method of claim 13 wherein said routing priority associated with said given voice packet to be routed is set higher than one or more routing priorities associated with voice packets previously transmitted to said cellular terminal via said first transmitter prior to said cellular hand-off from said first transmitter to said second transmitter.

15. A voice packet router in a communications network, the router having received a given voice packet to be routed, the given voice packet comprised in a transmitted sequence of voice packets, the router comprising:
- a scheduler which, determines that said given voice packet to be routed has a particular location in said sequence of transmitted voice packets relative to one or more other identified voice packets in said transmitted sequence of voice packets and which
- sets a routing priority associated with said given voice packet to be routed based upon said particular location in said transmitted sequence of said voice packets relative to said one or more other identified voice packets in said transmitted Sequence of voice packets, wherein
  (i) said communications network comprises a wireless communications network comprising a cellular terminal, a first transmitter and a second transmitter,
  (ii) said sequence of voice packets comprises a sequence of voice packets to be transmitted to said cellular terminal via said second transmitter as a result of a cellular hand-off from said first transmitter to said second transmitter,
  (iii) said one or more identified voice packets in said transmitted sequence of voice packets comprises a first voice packet in said sequence of voice packets to be transmitted to said cellular terminal via said second transmitter, and
  (iv) said particular location of said voice packet to be routed comprises said voice packet to be routed being within a predetermined number of packets of said first packet in said sequence of voice packets to be transmitted to said cellular terminal via said second transmitter.

16. The router of claim 15 wherein said routing priority associated with said given voice packet to be routed is set higher than one or more routing priorities associated with voice packets previously transmitted to said cellular terminal via said first transmitter prior to said cellular hand-off from said first transmitter to said second transmitter.

* * * * *